Jan. 20, 1953    M. A. WECKERLY    2,626,142
WEIGHING SCALE INDICATOR
Filed Jan. 30, 1947    2 SHEETS—SHEET 1
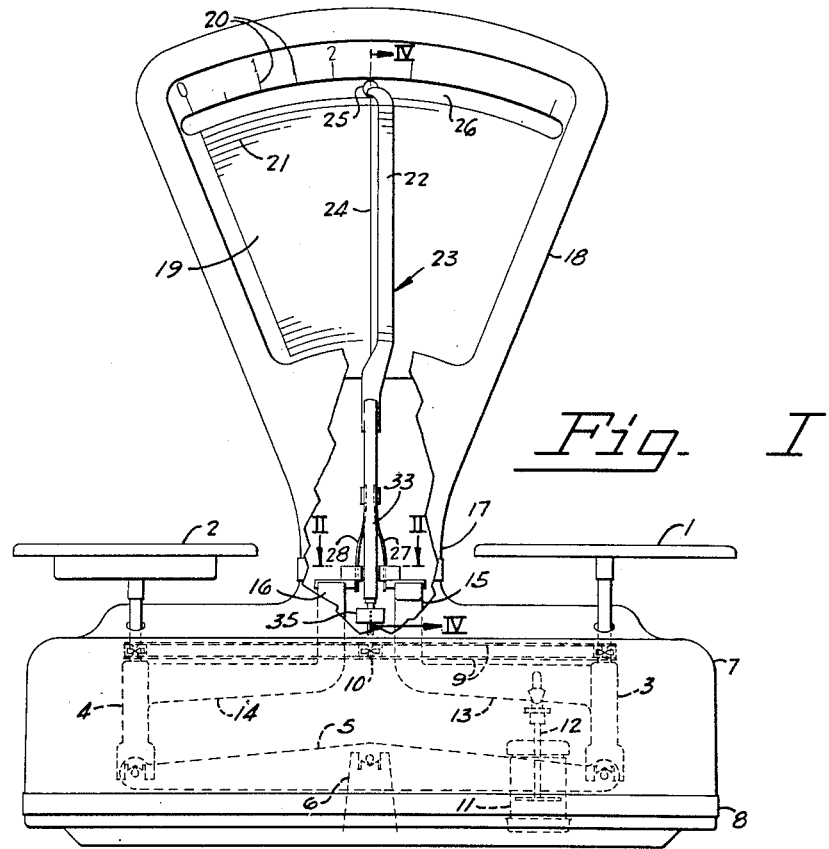
Fig. I
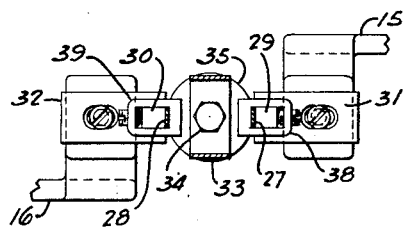
Fig. II
INVENTOR.
Mark A. Weckerly
BY
Marshall and Marshall
ATTORNEYS

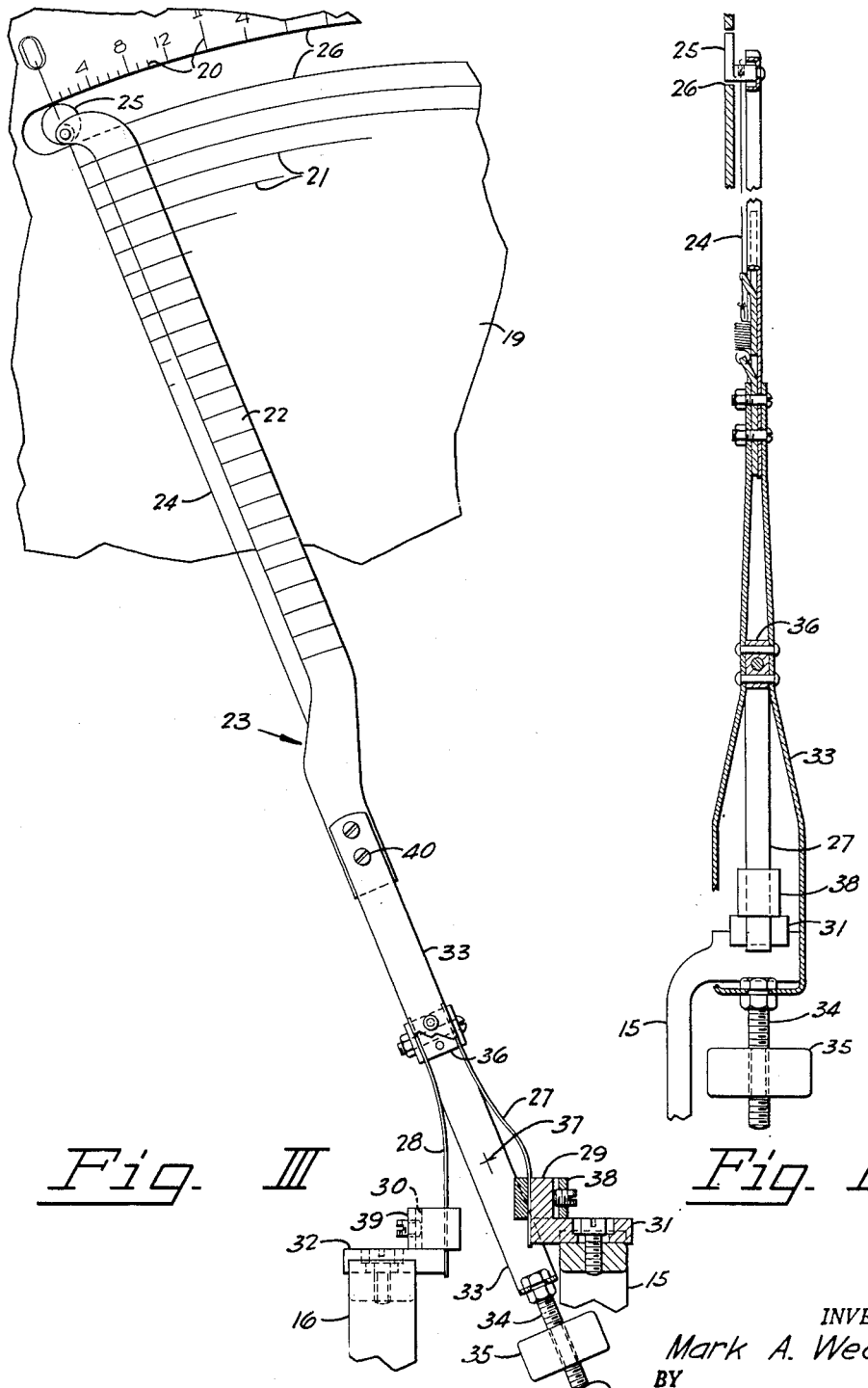

Patented Jan. 20, 1953

2,626,142

UNITED STATES PATENT OFFICE 2,626,142

WEIGHING SCALE INDICATOR

Mark A. Weckerly, Toledo, Ohio, assignor to Toledo Scale Company, Toledo, Ohio, a corporation of New Jersey Application January 30, 1947, Serial No. 725,357

4 Claims. (Cl. 265—54)

This invention relates to weighing scales and in particular to a weighing scale indicator and automatic counterbalance that provide a materially increased speed in making weight determinations.

Automatic weighing scales having indicators that cooperate with charts for indicating the weight of a load on a scale are in common usage. In all weighing scales of this type an appreciable length of time is required for the weighing scale to respond to a change in load and for its indicator to come to rest in position to indicate the magnitude of a load. In many operations involving weighing scales it is desirable that the weight indication be available as quickly as possible after a change in load has occurred.

The principal object of this invention is to provide an automatic counterbalance and an indicator that is not only accurate but that is very fast in its response to changes in load.

Another object of the invention is to provide an indicator that is extremely rugged and which is not easily damaged by a sudden application of load to a load receiver.

A still further object is to provide an indicator and load counterbalancing mechanism that is simple and easy to manufacture.

These and other more specific objects and advantages are apparent from the following description in which reference is made to the accompanying drawings.

According to the invention an indicator in the form of an elongated relatively rigid body is supported on a pair of resilient members or springs that are connected to relatively movable portions of the weighing mechanism of the scale. The resilient elements are attached to horizontally spaced portions of the indicator so that relative vertical movement of the other ends of the resilient members produces rotation of the indicator. The length and the spacing of the ends of the resilient members is adjustable so that the indicator may rotate through generally equal angles for equal increments of load. The relatively movable portions of the weighing scale may be the load receivers, the spiders supporting the load receivers, or a lever or levers of the scale. Each of these members move relative to other members or to fixed portions of the weighing scale and this relative motion may be used to drive an indicator.

In a preferred embodiment of the invention the relative motion between arms extending from the spiders carrying the load and counterweight receivers is employed to drive the indicator. This preferred embodiment is illustrated in the accompanying drawings.

In the drawings:

Figure I is a front elevation, with parts broken away, of a weighing scale embodying the invention.

Figure II is a fragmentary horizontal section taken substantially along the line II—II of Figure I.

Figure III is a greatly enlarged view of the indicator and a portion of a chart including fragments of the indicator driving mechanism.

Figure IV is a sectional view taken substantially along the line IV—IV of Figure I.

These specific figures illustrating a preferred embodiment of the invention are intended merely to illustrate the invention but not to impose limitations on the claims.

In the illustrated embodiment of the invention a load receiver 1 and a counterweight receiver 2 are supported from spiders 3 and 4, respectively, that are pivotally supported on the ends of a lever 5 that is pivotally supported on a fulcrum stand 6. The spiders 3 and 4 and lever mechanism are enclosed within a housing 7 that includes a base 8 from which the fulcrum stand 6 is erected. Check links 9 that are pivotally connected to the upper portions of the spiders 3 and 4 and that engage horizontally directed knife edges 10 located above the fulcrum stand 6 serve to hold the spiders 3 and 4 in vertical position.

The lever 5 that pivotally supports the spiders 3 and 4 consists of widely spaced side rails so that the lever is very stable against rotation about a longitudinal axis and provides widely spaced pivot points for the spiders 3 and 4 so that there is no danger of lateral tipping of the load receivers or the spiders. A dash pot 11 mounted in the base 8 between the side rails of the lever 5 has its plunger 12 pivotally connected to an arm 13 extending from the spider 3. The dash pot 11 serves to prevent continued oscillation of the lever system and load receivers following a change in load.

The arm 13 extending from the load receiver spider 3 and a similar arm 14 extending inwardly from the counterweight receiver spider 4 have upwardly extending ends 15 and 16 which are offset from the longitudinal horizontal axis of the scale to clear the check links 9 and which extend upwardly into a hollow column support 17 of a fan-shaped indicator housing 18. The indicator housing 18 encloses a substantially sector-shaped chart 19 upon which weight indicia 20 and amount indicia 21 are suitably printed. The amount indicia 21, providing computed prices for the quantity of material weighed on a scale, are computed according to fixed prices that are indicated by suitable indicia marked on a flat surface 22 of an indicator 23. The indicator 23 is provided with a stretched cord 24 that serves as an index for reading the amount indicia 21. An offset circular tip 25 of the indicator 23 lies in a slot 26 cut in the chart 19 between the weight indicia 20 and the amount indicia 21. The circular tip 25 is thus visible from either side of the chart so that customer's weight indication is available.

The indicator 23 is supported on a pair of springs 27 and 28 that are clamped to vertically extending tenons 29 and 30 (Figures II and III) of brackets 31 and 32 attached to the upper ends of the arm extensions 15 and 16.

Referring to Figures III and IV the lower portion of the indicator 23 consists of an elongated strip bent to form a narrow loop 33 in the lower end of which a stud 34 carrying a balance weight 35 is secured. Intermediate its ends the loop 33 is provided with a spacer block 36 that is riveted into place and to the parallel sides of which the resilient members or springs 27 and 28 are attached.

Since none of the parts of the indicator depend on pivotal connections they may be made of materials that are immune to corrosive atmosphere or accumulation of dirt.

The weight distribution of the indicator 23 including the balance weight 35 is such that its center of gravity is located near a point 37 that is below the spacer block 36 and above the level of the brackets 31 and 32 to which the supporting springs are attached. The lower ends of the springs are clamped against vertical surfaces of the tenons 29 and 30 by means of clamps 38 and 39. The horizontal spacing between the lower ends of the springs 27 and 28 is greater than the spacing between the upper ends so that when the indicator stands in its central or midscale position the springs are equally deflected and resemble, in elevation, a narrow wishbone. Relative vertical motion between the arms 13 and 14 corresponding to the relative motion between the load and counterweight receivers 1 and 2 pushes up on one of the springs and pulls down on the other with the result that the springs are deflected out of their neutral position and the indicator is rotated about a virtual turning center that coincides approximately with the center of gravity of the indicator.

To be commercially acceptable the indicator of an automatic weighing scale should rotate through generally equal angles for equal increments of load. The configuration of the indicator supporting springs 27 and 28 is such that the indicator 23 satisfies this requirement. Certain adjustments in counterbalancing mechanisms are necessary after a scale is constructed to secure predetermined indicator movements for given increments of weight. For this reason the clamps 38 and 39 that secure the springs 27 and 28 to the brackets 31 and 32 are arranged so that the active length of the springs 27 and 28 can be varied. Likewise, the brackets 31 and 32 are adjustably mounted in the upper ends of the upwardly extending arms 15 and 16 so that the spacing between the lower ends of the springs 27 and 28 between these members and the vertical center line of the chart can be adjusted. Because of the peculiar shape of the springs 27 and 28 when they are installed in the weighing scale, variations in the spacing between the lower ends of the springs varies the counterbalancing capacity. Thus if the indicator travel is less than it should be, i. e. the scale is fast at zero and slow at full capacity while it is correct at half capacity, the lower ends of the springs should be moved toward each other equal amounts by adjustment of the brackets 31 and 32 with respect to the ends of the arms 15 and 16. This has the effect of reducing the counterbalancing effect of the springs and increasing the indicator travel. Should it be found that the full scale reading is incorrect while zero and half capacity are correct, then one of the ribbons may be shortened or the other lengthened to equalize the weighing at zero and full capacity when the scale is balanced correctly at half capacity. The active lengths of the ribbons also affects the indicator travel in that if the ribbons are too long the scale will be too sensitive near half capacity and not sensitive enough at zero and full capacity. This results in a slow indication at the first quarter of the chart and a fast indication at the third quarter. Shortening the ribbons and moving the brackets 31 and 32 toward each other corrects this condition. Reverse adjustments correct errors of opposite sign.

If a weighing scale indicator that is supported by means of load counterbalancing springs is sufficiently light in comparison with the mass of the load receivers it may be attached to the indicator springs with rubber or plastic washers and its vibration in response to shock loading is sufficiently damped so that the vibration does not affect the speed of response or the weight indication. If the indicator has substantial mass this condition no longer obtains and the continued vibration of the indicator, regardless of the adjustment of the dash pot, decreases the speed of response by delaying the time at which the indicator vibration subsides.

The indicator 23 including the balance weight 35 has a moment of inertia such that when it is supported by the springs 27 and 28 from the load receiver spiders it has two natural modes of vibration. These modes may be easily observed by disconnecting the dash pot 11. In the first or low frequency mode of vibration the indicator rotates about a virtual center near the point 37 and the indicator tip moves toward the high capacity end of the chart as the load receiver 1 moves downwardly. This mode of vibration takes place at approximately two cycles per second in the weighing scale illustrated.

A second mode of vibration in which the indicator appears to rotate about a virtual center located near screws 40 that join the loop portion 33 to the upper portion of the indicator may also be excited. In this mode of vibration the indicator tip moves toward the zero end of the chart as the load receiver 1 moves downwardly. The frequency of this vibration is approximately three times that of the first mode of vibration. These two modes of vibration may be simultaneously excited and tend to synchronize themselves such that the indicator tip executes a motion that may be described as a rapid traverse from one limit of its oscillation to the other accompanied by a distinct pause or rest at each limit of the oscillation. This motion corresponds to the substantially flat-topped wave that, in electrical engineering work, is associated with the combination of a fundamental and a third harmonic in which the positive maximum value of the third harmonic wave coincides with the maximum negative value of the fundamental wave. When the dash pot is connected it extracts energy from each mode of vibration and thereby serves to quickly eliminate each vibration.

When a load is suddenly applied or removed from the load receiver 1 the resulting indicator action may be resolved into components corresponding to the fundamental and the second modes of vibration. If the frequency ratios of the modes of vibration correspond approximately to the 3 to 1 ratio set forth the indicator tip appears to remain motionless for a small fraction of a second, then travel rapidly through about 90 per cent of the distance to the new balance point, then stop or hesitate momentarily at that point and then move forward to the balance point. This motion results from a combination of a damped single degree of motion in which the indicator accelerates rapidly to its maximum velocity and then decelerates smoothly as the indicator approaches the balance point and a higher frequency damped vibration in which the indicator executes two or possibly three cycles of vibration before that mode of vibration is completely eliminated by the action of the dash pot. At the first instant of a change in load the two motions appear to cancel each other so that the indicator tip hesitates momentarily. A moment later when the velocity components of the two motions are in phase the indicator moves rapidly across the chart. A moment later, when the high frequency vibration has gained a half cycle on the low frequency vibration, the velocity components again cancel each other so that the indicator tip apparently comes to rest or hesitates. By this time the motion due to the fundamental or low frequency mode of vibration is practically absent so that the remaining indicator travel corresponds to the third and possibly fourth half cycles of the higher frequency mode of vibration.

If the ratio between the two modes of vibration differs in large amount from that set forth the dash pot is not as effective in damping the higher frequency vibration and, further, since the vibration is not directly related to the lower frequency indicator motion it is much more readily apparent and appears to materially increase the time for the indicator to come to rest after a change in load.

When the frequencies of the two modes of vibration are somewhere in the range of 3 to 1 the indicator action as a result of the two modes does not display the higher frequency mode of vibration but rather gives the impression of having unusually high speed accompanied by a quick stop at the new balance point.

The absence of any delicate supports for the indicator and the freedom from parts that must operate with small clearances between each other yields a force counterbalancing and indicating mechanism that is not only very rugged but which is also very free from the effects of corrosive atmospheres and accumulation of dirt. Furthermore, the structure is simple and easy to construct as well as being easy to adjust to secure correct indications.

Having described the invention, I claim:

1. An automatic load counterbalance and indicator for a weighing scale, comprising an elongated body serving as an indicator, a pair of resilient members having first ends attached to spaced apart portions of the scale one of which moves relative to the other in response to loads on the scale, said members being attached to the indicator with the other ends of the members held in generally parallel alignment with the axis of the elongated body and spaced apart less than the spacing of the first ends, and means for adjusting the separation between the ends of the resilient members attached to the relatively movable portions of the scale to adjust the sensitivity of the scale.

2. An automatic load counterbalance and indicator for a weighing scale, comprising an elongated body serving as an indicator, a pair of resilient members having first ends attached to separated portions of the scale one of which moves relative to the other in response to a load on the scale, said members being attached to the indicator with the other ends of the members held in generally parallel alignment with the axis of the elongated body and spaced apart less than the first ends, means for varying the length of the resilient members, and means for adjusting the separation between the ends of the resilient members attached to the relatively movable portions of the scale to adjust the sensitivity of the scale.

3. In a weighing scale having portions movable in response to a load on the scale, in combination, an elongated body serving as an indicator, a pair of flat springs having portions attached to the elongated body, said portions being generally parallel to each other and to the longitudinal axis of the elongated body, said springs having other portions attached to portions of the scale that are movable with respect to each other with the springs diverging from the elongated body and with the attached portions mounted generally parallel to each other, and a counterweight on the elongated body of a mass and position such that the composite center of gravity of the indicator and counterweight is positioned between said flat springs.

4. In a weighing scale having relatively movable parts including load and counterweight receivers, in combination, an elongated body adapted to serve as an indicator, said body having a center of gravity, a pair of flat springs flexible in bending that are attached to and that extend generally parallel to the path of movement of parts of the weighing scale that move in response to loads on the scale, mounting means on the elongated body intermediate its ends for receiving in parallel relation the ends of said flat springs remote from the relatively movable scale parts, said mounting means having a size such that the ends of the flat springs attached thereto are closer each other than are the ends attached to the relatively movable scale parts, said mounting means on the elongated body being located such that the center of gravity of the member is located between the flat springs.

MARK A. WECKERLY.

REFERENCES CITED

The following references are of record in the file of this patent:

UNITED STATES PATENTS

| Number | Name | Date |
| --- | --- | --- |
| 1,703,406 | Schaper | Feb. 26, 1929 |
| 1,893,205 | Hughes | Jan. 3, 1933 |
| 1,894,025 | Dennison et al. | Jan. 10, 1933 |
| 1,905,898 | Cameron | Apr. 25, 1933 |
| 2,071,404 | Hurt | Feb. 23, 1937 |
| 2,384,519 | Aller | Sept. 11, 1945 |

FOREIGN PATENTS

| Number | Country | Date |
| --- | --- | --- |
| 551,640 | Great Britain | Mar. 3, 1943 |